Feb. 18, 1964     T. T. WHIPPLE ETAL     3,121,457
BURNER ASSEMBLY FOR SYNTHESIS GAS GENERATORS
Filed Dec. 11, 1956     4 Sheets-Sheet 1
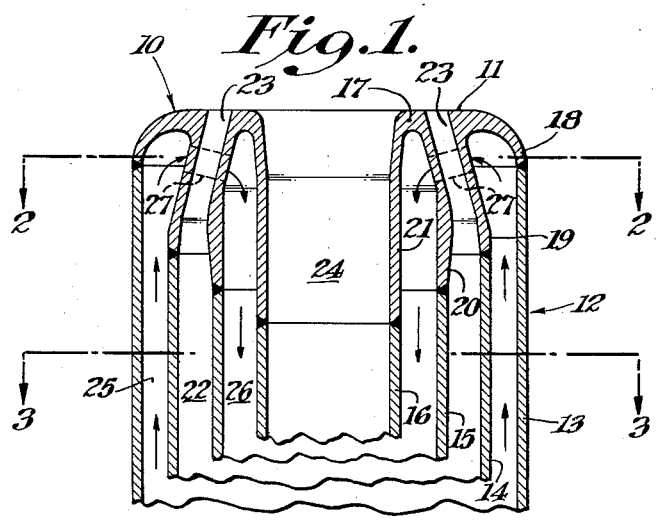
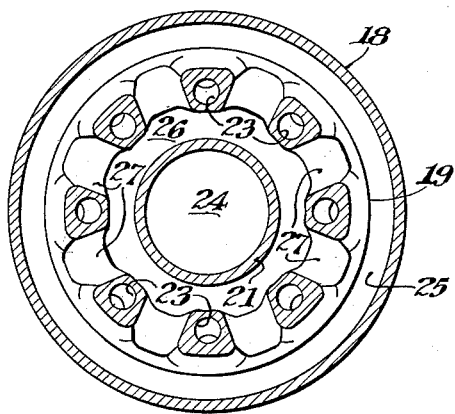
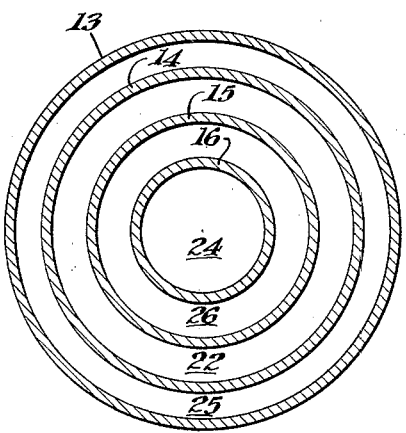
INVENTORS
THOMAS T. WHIPPLE
OTTO C. SCHAUBLE &
LEV A. MEKLER
BY
AGENT

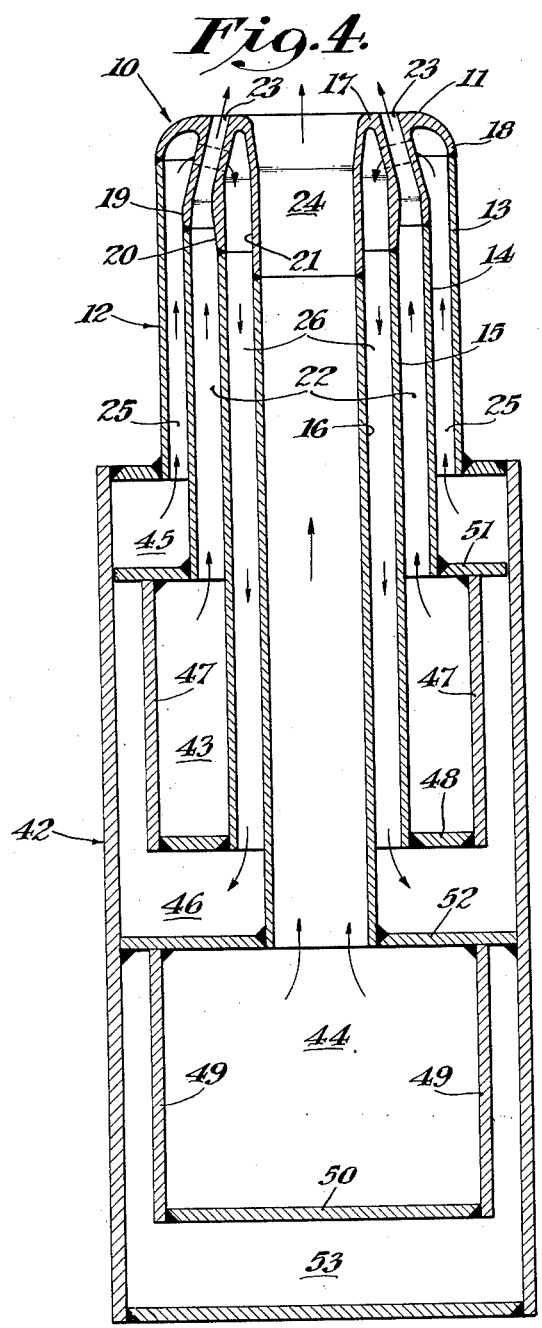

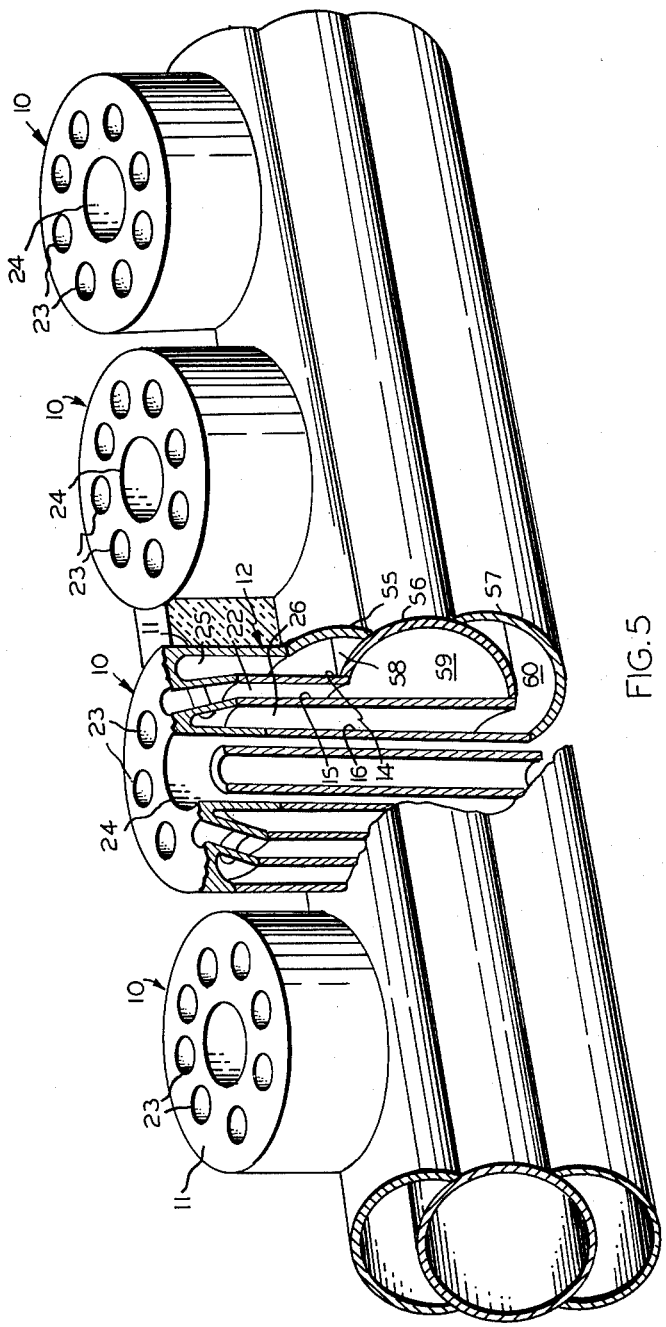

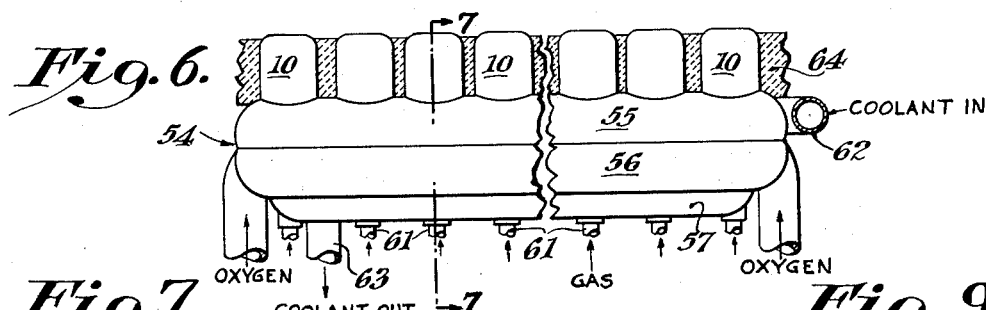
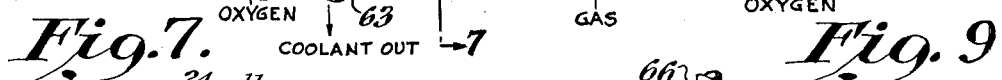
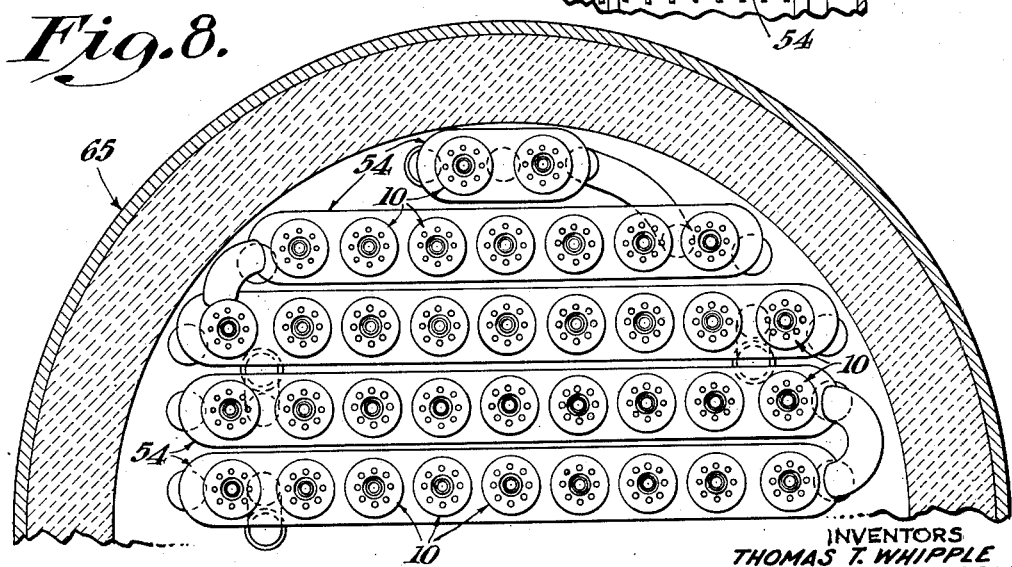

United States Patent Office 3,121,457
Patented Feb. 18, 1964

3,121,457
BURNER ASSEMBLY FOR SYNTHESIS GAS
GENERATORS
Thomas T. Whipple, Scarsdale, Otto C. Schauble, Mount
Kisco, and Lev A. Mekler, Jackson Heights, N.Y.,
assignors to The Lummus Company, New York, N.Y.,
a corporation of Delaware
Filed Dec. 11, 1956, Ser. No. 627,680
5 Claims. (Cl. 158—104)

This invention relates to fluid fuel burners and more particularly to fluid fuel burners of the kind used in the production of a gas rich in hydrogen and carbon monoxide, useful for the synthesis of organic compounds.

It has been known for some time that a gaseous mixture comprising hydrogen and carbon monoxide in relatively large portions may be produced by both partial combustion of normally gaseous hydrocarbons, such as methane, and by the reaction of normally gaseous hydrocarbons with steam and/or carbon dioxide. For illustrative purposes, the apparatus of the invention shown on the attached drawings is for use as a conversion burner, for partial combustion of methane to form carbon monoxide and hydrogen.

One of the main requirements of such a conversion burner for partial combustion is that substantially equal portions of the total stream of hydrocarbons must be mixed before ignition in substantially exact proportion with the corresponding portions of the total stream of oxygen. Such mixing may be accomplished by means of precisely located and accurately machined orifices. Without such precision mixing some portions of the hydrocarbons may undergo complete combustion while other portions will be unoxidized and thermally decomposed into hydrogen and carbon with the formation of soot, lamp black and other types of extremely fine solid particles. The formation of such solid particles not only reduces the yields of desired CO and $H_2$ and disturbs the optimum ratio of $CO_2$ to $H_2$, but also causes carbon deposits within the reaction vessel which may require frequent shutdown of the process unit. Therefore, a burner for this service must be designed so that the desired proportional relationship between the co-mingled portions of the hydrocarbon gas and oxygen is maintained at all times during the operation and is not changed by distortion due to pressure or temperature stresses in the orifices and the structural members which define the approach to such discharge from the orifices.

Where partial combustion of methane to form carbon monoxide and hydrogen is the desired reaction, the final reaction in general is represented by the following formula:

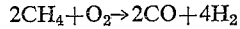

$$2CH_4 + O_2 \rightarrow 2CO + 4H_2$$

Intermediate reactions may occur as follows:

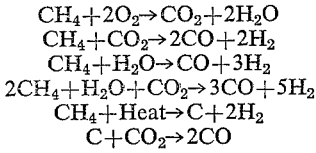

$$CH_4 + 2O_2 \rightarrow CO_2 + 2H_2O$$
$$CH_4 + CO_2 \rightarrow 2CO + 2H_2$$
$$CH_4 + H_2O \rightarrow CO + 3H_2$$
$$2CH_4 + H_2O + CO_2 \rightarrow 3CO + 5H_2$$
$$CH_4 + Heat \rightarrow C + 2H_2$$
$$C + CO_2 \rightarrow 2CO$$

The reaction temperatures which may be experienced in this conversion process are in the order of 2600° F. and higher, and one of the major problems encountered is one of providing adequate cooling for the burner elements to prevent their deterioration at such temperatures.

It is the primary object of this invention to provide a burner structure for a flow-type gas generator without accumulative thermal stresses beyond the ability of the metal to withstand such stresses and to supply cooling means to permit burner operation over substantial time periods under high temperature operation with a minimum stress in the face of the structure subjected to radiation from the flame and refractories in the generator.

A further object of this invention is to form a number of parallel paths for the hydrocarbon gas and oxygen and a coolant circuit in series with a sufficient flow of coolant to keep the maximum, minimum and mean logarithmic temperature difference between the metals and coolant close to the average arithmetic difference of these temperatures in a burner assembly in which the individual burner elements form an integral cluster-type unit for a flow-type gas generator.

A still further object of this invention is to provide a burner assembly which permits the maintaining of a substantially constant ratio of hydrocarbon gas and oxygen through the entire operating range of capacities of each individual burner which may between 50% and 150% of rating.

A still further object of this invention is to provide a burner in which a coolant barrier circuit is located between the hydrocarbon gas and the oxygen passages and around these passages, with the coolant circuit maintained at a lower pressure than pressures in the oxygen and hydrocarbon passages so that a reactant leaking through a burner passage wall will always commingle with coolant and be carried away therewith, thereby to guard against combustion within the burner.

Another object of this invention is to arrange the individual burner elements in a projected fashion with respect to associated structural components so that there are no accumulative stresses in the exposed hot portions of the individual burner which affect such associated structural components of the burner or burner assembly.

Other objects and advantages of this invention will be apparent from the following description taken in connection with the accompanying drawing in which:

FIGURE 1 is a fragmentary sectional view of a burner element illustrating in detail the structure and the manner of coolant and gas flow therethrough.

FIGURE 2 is a horizontal sectional view of the burner element taken on the line 2—2 of FIGURE 1.

FIGURE 3 is a horizontal sectional view of the burner element taken on the line 3—3 of FIGURE 1.

FIGURE 4 is a vertical sectional view to illustrate in further detail a burner and one possible form of header arrangement.

FIGURE 5 is an isometric view partly in section illustrating a plurality of burner elements mounted on and projecting from a header arrangement.

FIGURE 6 is a side elevation view of a burner assembly embodying the principles of this invention.

FIGURE 7 is a vertical section on line 7—7 of FIGURE 6 showing an alternate form of header arrangement.

FIGURE 8 is a top plan view of a burner assembly showing a preferred burner and header arrangement.

FIGURE 9 is a side elevation, partly in section, of a synthesis gas generator, showing a burner and header assembly positioned therein.

Referring first to FIGURE 1, each individual burner element includes a burner can 10 comprised of a face plate 11 and a concentric tubular burner stem 12, the burner stem 12 being comprised of concentric pairs of pipes 13 and 14, and 15 and 16. The face plate 11, as shown, is part of a casting 17 which includes extensions 18, 19, 20 and 21 which may be welded at their lower ends to pipes 13, 14, 15 and 16, respectively. The reactant gases, for example, methane and oxygen, are fed to the burner elements through header conduits as described hereinafter. Oxygen from a header conduit is introduced to the burner can 10 and passes toward face plate 11 through an annular passageway 22 formed by pipes 14 and 15, the annular passageway 22 terminating in a number of elongated oxygen orifices 23 which open through face plate 11. These orifices are designed to provide the major component of the pressure drop through the oxygen circuits and act as equalizing metering means for distribution of the oxygen between the orifices and the individual cans. A central conduit 24, formed within pipe 16 and opening through face plate 11, provides a passageway and unitary orifice for reactant hydrocarbon gases. Passage 24 is also designed to provide the major component of the pressure drop and act as equalizing metering means for the hydrocarbon gas feed to each can. Annular coolant passages 25 and 26 are formed between pipes 13 and 14, and 15 and 16, respectively, such passages being arranged for series-flow of the coolant from one passage to the other through a number of channels 27 located below face plate 11 and between orifices 23. In accord with this arrangement of passages the coolant flows in a manner to cool the cylindrical outer pipe 13, the face plate 11 and the adjacent pipes 14, 15 and 16. The coolant, supplied to either passage 25 or 26 and withdrawn from either passage 26 or 25, further acts as a liquid seal between reactants in passages 22 and 24.

FIGURE 2 is a horizontal sectional view of the burner element taken on line 2—2 of FIGURE 1, and better illustrates the arrangement of a plurality of orifices 23, arranged at substantially equal distances around face plate 11. Located between each orifice 23 is a coolant passage 27 through which the coolant may pass between passages 25 and 26 as directed by the coolant feed and discharge headers communicating with such passages. Conduits 27 permit the coolant to cool face plate 11 which under operating conditions may be subjected to flame and radiation temperatures as high as 3000 to 3500° F.

FIGURE 3 is a horizontal sectional view of the burner element taken on line 3—3 of FIGURE 1 and illustrates a preferred burner arrangement of concentric pipes 13, 14, 15 and 16.

FIGURE 14 illustrates in further detail the burner element of FIGURE 1 in combination with one possible form of header arrangement for a multiple unit burner assembly. The burner element, consisting primarily of burner can 10, including internal passages 22, 24, 25 and 26, is mounted on and communicates with conduits of the header, generally indicated at 42.

The header 42 is comprised of reactant conduits 43 and 44 and coolant conduits 45 and 46 which communicate with passages 22, 24, 25 and 26, respectively, of the burner can. Conduit 43, formed by walls 47 and 48, is supplied (feed means not shown) with oxygen for parallel feed to the individual burner elements. Conduit 44, formed by walls 49 and 50, is located at a point removed from and below conduit 43 within header 42 and is supplied (feed means not shown) with the gaseous hydrocarbon reactant for parallel feed through the central passage 24 of each burner can. Horizontal partitions 51 and 52 divide the remaining area of the header into coolant conduits 45, 46 and 53.

Where series coolant flow from burner to burner is preferred, coolant in conduit 45 flows first through outer passage 25 and inner passage 26 of the first burner can to conduit 46. Conduit 46 is divided into sections by partitions (not shown) spaced along its length so that the coolant can leave passages 26 only in alternate burners in the burner assembly. In this manner the next burner and its alternate burners in the burner assembly receive coolant through inner passages 26 and discharge coolant through outer passages 25 to conduit 45. Conduit 45 is likewise divided into sections by partitions (not shown) spaced along its length so that coolant entering such conduit from passages 25 can leave only through passage 25 of the adjacent burner can. Conduit 53, formed in the lower section of header 42, is used only as a combination supply and return passage for coolant between the burner assembly and the external supply and discharge coolant lines (not shown). Conduit 53 is provided with transverse partitions (not shown) whereby the inlet and outlet connection is made between such conduit and conduit 46.

The above described header arrangement provides for coolant flow in series from one burner to the next adjacent burner, assuring that each burner has the same amount of coolant passing therethrough and substantially the same extent of cooling. The arrangement of coolant flow through the burner assembly can also be in parallel by eliminating partitions in conduits 45 and 46 so that the coolant in conduit 45 enters passage 25 of each burner can and leaves through passages 26 and conduit 46. Where parallel coolant flow is desired the header including conduits 45 and 46 can be arranged to eliminate conduit 53.

To assure substantially uniform distribution of coolant between the cans connected to the headers, passages 27 between the oxygen orifices are made small enough to provide a major portion of the pressure drop through the coolant circuit and restricting orifices are placed on the inlet to passages 25 of each can for the same purpose.

FIGURE 5 is an isometric view partly in section illustrating a plurality of burner elements including cans 10 mounted on and projecting from a header arrangement, generally indicated as 54. The header arrangement 54 is comprised of pipe sections 55, 56 and 57 forming conduits 58, 59 and 60 communicating with passages 25, 22 and 26, respectively, of burner cans 10.

With parallel coolant flow the reactant and coolant supply conduits, forming the header for the assembly of burner elements, can be arranged in concentric fashion or as illustrated in FIGURES 5 and 7. In FIGURE 7 the multiple burner header 54 is comprised of pipe sections 55, 56 and 57, forming conduits 58, 59 and 60, which communicate with passages 25, 22 and 26, respectively, of burner can 10. The reactant gases, for example methane and oxygen, are fed to the burner elements through passage 24 and conduit 59, respectively. A coolant, such as water, passes at relatively high velocity from conduit 58 through passage 25, conduits 27 and passage 26 of each burner element and conduit 60 of the header. For purposes of alleviating expansion difficulties a separate, freely supported, pipe 61 may be situated centrally within passage 24 to provide means for supplying the reactant hydrocarbon gas from a separate header (not shown).

FIGURE 6 shows the individual burner cans 10 of FIGURE 7 mounted in the multiple header 54. While the header member is shown as being elongated in form, it can also assume a variety of annular or plain figure shapes without materially affecting operation. In addition, the header of either series or parallel coolant flow design may be made up of segments as shown in FIGURE 9 to obviate any difficuty caused by expansion of the heated metals. Where the header of FIGURE 7 is used, the pipes 55, 56 and 57, forming the header, are bored to receive the individual concentric stem elements of the burner can, the latter having mating projections which are welded to the header. The individual burner elements may thus be rigidly affixed to the reactant and cooling conduits of the header in fluid tight relation thereto.

The cooling water in conduit 58 is supplied through pipe 62 and is removed from conduit 60 through pipe 63, as shown in FIGURE 6. By maintaining a high rate of flow of the coolant, each burner can 10 and the cooling jacket itself is cooled by direct heat exchange with the circulating coolant. In this manner, the burner elements, and particularly the burner face 11 of each element, are maintained at a sufficiently low temperature to prevent or substantially retard their deterioration. During process operation each burner face is in effect in a plastic state that is maintained by the gas pressure within the generator on one side and by the high coolant pressure on the other side. A suitable refractory material 64 is placed between each burner can to protect the portion of the assembly, other than the individual burner faces, from the intense heat of reaction.

Groups of individual burner elements may be conveniently arranged as shown in FIGURE 8 with corresponding tubular passageways of the individual burner groups linked for supplying the reactant fluids to the burners.

FIGURE 9 shows an arrangement with the entire assembly of FIGURE 8 mounted in a flow-type gas generator 65. The generator is provided with an outlet 66 for the reaction products which, in accordance with standard practice, may be led to a waste heat boiler wherein the heat would be utilized to generate steam.

It is to be understood that the embodiments of the present invention as shown and described herein are only illustrative and that many variants of the general arrangement may be used without departing from the spirit and scope of the invention as set forth in the following claims.

We claim:

1. A burner assembly comprising: a closed hollow header including a plurality of separately sealed fluid reactant and cooling conduits; at least one burner element comprised of two concentric pairs of concentric tubes mounted on and projecting from said header, the axis of said burner element being substantially perpendicular to the axis of said header, a face plate spanning the projecting end of said tubes, said tubes forming therebetween annular passageways independently communicating in fluid tight relation with said conduits, the innermost tube of said pairs of tubes communicating with a first of said separately sealed fluid reactant conduits at its mounted end and terminating at its projecting end in a reactant orifice located centrally in said face plate whereby a first fluid reactant stream is directed centrally through said orifice, the annular passageway formed between said pairs of tubes communicating with a second of said separately sealed fluid reactant conduits at the header end of said passageway and terminating at its projecting end in a plurality of symmetrically spaced reactant orifices located in said face plate concentrically around said centrally located reactant orifice and formed to direct a second fluid reactant as a plurality of streams into uniform intersecting a relation with said first reactant stream, the annular passageways formed between the tubes of each pair of concentric tubes communicating with said separate coolant conduits at the header end of said passageways and communicating with each other through a plurality of passages located in close proximity to the surface of said face plate and between said symmetrically spaced reactant orifices; means for supplying fluid reactants to said reactant conduits for passage through each burner element; means for supplying a fluid coolant to a first of said coolant conduits for passage through said conduit and successively through the respective communicating annular passageway of each burner element, said plurality of passages of each burner element, the annular passageway of each burner element communicating with a second of said coolant conduits, and the second coolant conduit; and means for removing said fluid coolant from said second coolant conduit.

2. A burner assembly as claimed in claim 1 in which the reactant orifices provide the major component of pressure drop in the flow of reactants through the assembly.

3. The burner assembly as claimed in the claim 1 in which the reactant orifices form metering and equalizing means for reactant flow to each orifice and to the total of effective orifices of each burner element.

4. A burner assembly as claimed in claim 1 in which the burner elements of the assembly project from the header in substantially the same direction and said elements are spaced out of contact with each other whereby there is no accumulation of differential expansion and thermal stress in the face plates and outer surface of such elements.

5. A burner assembly as claimed in claim 1 in which the innermost tube of said pairs of tubes of each burner element communicates with a reactant conduit located without the header.

References Cited in the file of this patent

UNITED STATES PATENTS

| | | |
|---|---|---|
| 2,408,282 | Wolf | Sept. 24, 1946 |
| 2,433,610 | Hughey | Dec. 30, 1947 |
| 2,725,933 | Gaucher | Dec. 6, 1955 |
| 2,767,785 | Eastman et al. | Oct. 23, 1956 |
| 2,863,656 | Cox | Dec. 9, 1958 |
| 2,894,569 | Jacolev | July 14, 1959 |
| 2,941,587 | Hagy et al. | June 21, 1960 |
| 2,943,674 | Birkness et al. | July 5, 1960 |
| 2,971,578 | Davis | Feb. 14, 1961 |